US008116227B1

(12) United States Patent
Prairie et al.

(10) Patent No.: US 8,116,227 B1
(45) Date of Patent: Feb. 14, 2012

(54) OPTIMAL AUTOMATED EXPLORATION OF HIERARCHICAL MULTIPROTOCOL LABEL SWITCHING LABEL SWITCH PATHS

(75) Inventors: Danny Prairie, Kanata (CA); Yufei Shi, Kanata (CA); George Swallow, Boston, MA (US); Thomas D. Nadeau, Hampton, NH (US); Vanson Lim, Cambridge, MA (US); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 11/642,473

(22) Filed: Dec. 20, 2006

(51) Int. Cl.
*H04L 12/28* (2006.01)
*H04L 12/56* (2006.01)
(52) U.S. Cl. .................. 370/254; 370/255; 370/392
(58) Field of Classification Search .................. 370/392, 370/254, 255
See application file for complete search history.

(56) References Cited

U.S. PATENT DOCUMENTS

| | | | |
|---|---|---|---|
| 2003/0028818 A1* | 2/2003 | Fujita ................................ 714/4 |
| 2003/0056007 A1* | 3/2003 | Katsube et al. .............. 709/238 |
| 2003/0065711 A1* | 4/2003 | Acharya et al. .............. 709/203 |
| 2003/0108029 A1* | 6/2003 | Behzadi ........................ 370/351 |
| 2004/0022194 A1* | 2/2004 | Ricciulli ....................... 370/238 |
| 2005/0281192 A1 | 12/2005 | Nadeau et al. ................ 370/217 |
| 2005/0281259 A1* | 12/2005 | Mitchell ....................... 370/389 |
| 2006/0104210 A1* | 5/2006 | Nielsen ......................... 370/248 |
| 2006/0126495 A1 | 6/2006 | Guichard et al. .............. 370/216 |
| 2006/0198321 A1 | 9/2006 | Nadeau et al. ................ 370/254 |
| 2007/0025241 A1 | 2/2007 | Nadeau et al. ................ 370/229 |
| 2008/0095061 A1* | 4/2008 | Hua et al. ..................... 370/248 |
| 2008/0253281 A1* | 10/2008 | Li et al. ......................... 370/218 |

OTHER PUBLICATIONS

K. Kompella, et al., RFC 4379—"Detecting Multi-Protocol Label Switched (MPLS) Data Plane Failures", Feb. 2006, available on Jun. 30, 2009, at http://tools.ietf.org/html/rfc4379, 51 pgs.

* cited by examiner

*Primary Examiner* — Marsha D Banks Harold
*Assistant Examiner* — Saad Hassan
(74) *Attorney, Agent, or Firm* — Brinks, Hofer, Gilson & Lione

(57) ABSTRACT

Optimal automated exploration of hierarchical MPLS LSPs is disclosed. A path verification message (PVM) is transmitted from an initial router. Each label in the PVM's label stack corresponds to a hierarchy layer and is associated with a time-to-live (TTL) field. The TTL field for the label of a current layer is set so the PVM travels one hop from the initial router. In response, a reply message indicating that the PVM reached its destination is received. These steps are then repeated. For each successive PVM transmitted, the TTL field associated with a label corresponding to the current hierarchy layer is incremented. For any reply message including information describing a non-current layer, modify the next PVM's label stack and increment the TTL field of the label for the described different layer; any other TTL fields are unchanged. If any received reply message indicates a destination router was reached, the process terminates.

23 Claims, 8 Drawing Sheets

301 TRANSMIT, IN A NETWORK COMPRISING A PLURALITY OF ROUTERS AND LINKS INTERCONNECTING THE ROUTERS, WHEREIN THE PROTOCOL USED TO SETUP ONE OR MORE LABEL SWITCHED PATHS IS MULTIPATH LABEL SWITCHING PROTOCOL, A PATH VERIFICATION MESSAGE FROM AN INITIAL ROUTER ALONG A PATH, WHEREIN A LABEL STACK OF THE PATH VERIFICATION MESSAGE INCLUDES ONE OR MORE LABELS, WHEREIN EACH LABEL IN THE LABEL STACK CORRESPONDS TO A LAYER IN THE HIERARCHY OF THE PATH, WHEREIN A TIME-TO-LIVE FIELD IS ASSOCIATED WITH EACH LABEL, AND WHEREIN AN INITIAL VALUE OF THE TIME-TO-LIVE FIELD FOR THE LABEL CORRESPONDING TO A CURRENT LAYER ALLOWS THE PATH VERIFICATION MESSAGE TO TRAVEL ONE HOP ALONG THE PATH FROM THE INITIAL ROUTER

302 IN RESPONSE, RECEIVE AN REPLY MESSAGE, WHEREIN THE REPLY MESSAGE INDICATES THAT THE PATH VERIFICATION MESSAGE REACHED ITS DESTINATION

TO FIG. 3B STEP 303

FIG. 3A

501 TRANSMIT, IN A NETWORK COMPRISING A PLURALITY OF ROUTERS AND LINKS INTERCONNECTING THE ROUTERS, WHEREIN THE PROTOCOL USED TO SETUP ONE OR MORE LABEL SWITCHED PATHS IS MULTIPATH LABEL SWITCHING PROTOCOL, A PATH VERIFICATION MESSAGE FROM AN INITIAL ROUTER ALONG A PATH, WHEREIN A LABEL STACK OF THE PATH VERIFICATION MESSAGE INCLUDES ONE OR MORE LABELS, WHEREIN EACH LABEL IN THE LABEL STACK CORRESPONDS TO A LAYER IN THE HIERARCHY OF THE PATH, WHEREIN A TIME-TO-LIVE FIELD IS ASSOCIATED WITH EACH LABEL, AND WHEREIN AN INITIAL VALUE OF THE TIME-TO-LIVE FIELD FOR THE LABEL CORRESPONDING TO A CURRENT LAYER ALLOWS THE PATH VERIFICATION MESSAGE TO TRAVEL ONE HOP ALONG THE PATH FROM THE INITIAL ROUTER

508 TRANSMIT A PATH VERIFICATION MESSAGE FROM AN INITIAL ROUTER OF A CHILD LAYER ALONG A PATH, WHEREIN THE LABEL SWITCHED PATH IS A CONTIGUOUS LABEL SWITCHED PATH, WHEREIN A LABEL STACK OF THE PATH VERIFICATION MESSAGE INCLUDES ONE OR MORE LABELS, WHEREIN EACH LABEL IN THE LABEL STACK CORRESPONDS TO A LAYER IN THE HIERARCHY OF THE PATH, WHEREIN A TIME-TO-LIVE FIELD IS ASSOCIATED WITH EACH LABEL, AND WHEREIN AN INITIAL VALUE OF THE TIME-TO-LIVE FIELD FOR THE LABEL CORRESPONDING TO A CURRENT LAYER ALLOWS THE PATH VERIFICATION MESSAGE TO TRAVEL ONE HOP ALONG THE PATH FROM THE INITIAL ROUTER

502 IN RESPONSE, RECEIVE AN REPLY MESSAGE, WHEREIN THE REPLY MESSAGE INDICATES THAT THE PATH VERIFICATION MESSAGE REACHED ITS DESTINATION

TO FIG. 5B STEP 503

FIG. 5A

OPTIMAL AUTOMATED EXPLORATION OF HIERARCHICAL MULTIPROTOCOL LABEL SWITCHING LABEL SWITCH PATHS

BACKGROUND

The Multiprotocol Label Switching (MPLS) protocol, defined in Internet Engineering Task Force (IETF) RFC 3031, is a protocol that combines the label-based forwarding of asynchronous transfer mode (ATM) networks with the packet-based forwarding of Internet Protocol (IP) networks, and builds applications upon this infrastructure. Traditional MPLS, and more recently Generalized MPLS (G-MPLS) networks as well, extend the suite of IP protocols to expedite the forwarding scheme used by conventional IP routers, particularly through core networks employed by service providers (as opposed to end-user connections or taps). Conventional routers typically employ complex and time-consuming route lookups and address matching schemes to determine the next hop for a received packet, primarily by examining the destination address in the header of the packet. MPLS simplifies this operation by basing the forwarding decision on a simple label, via a so-called Label Switched Router (LSR) mechanism. Therefore, another major feature of MPLS is its ability to place IP traffic on a particular defined path through the network as specified by the label. Such path specification capability is generally not available with conventional IP traffic. This type of path is known as a label switched path.

A label switched path specifies not only a destination, but also specific routes (router nodes) along a path, thus simplifying routing decisions at each individual hop. Put another way, the label switched path raises the level of granularity, or atomicity, of the conventional IP routing hop from a single router to an entire path through the network. This path includes multiple routers (i.e. "hops") and other switching entities, and typically spans an MPLS network, though may represent other device-to-device paths as well.

Upon entry to an MPLS network, an MPLS-specific header is inserted at the front of each packet to, in effect, re-encapsulate it. The MPLS header contains a stack of labels—one or more—that uniquely identify the switching path between any two LSRs. This label tells adjacent switching nodes how to process and forward the data. As each packet is received by a node, it may push a new label onto the stack of a packet before forwarding it on, pop one from the stack, or swap one or more of the labels with new ones. The path of the packet through the network is defined by its initial labeling. Accordingly, the subsequent mapping of labels is consistent at each node so as to form a complete label switched path between the ingress to and the egress from the MPLS network.

SUMMARY

When attempting to diagnose a Label Switch Path (LSP) failure, it is not always sufficient to diagnose solely the LSP where the failure was detected. One method of diagnosing the failure is to run an LSP ping while increasing the time-to-live (TTL) of the associated LSP's label by one at each echo request transmitted. While this may immediately identify the source of the failure, there are many cases where further investigation may be required. In general, whenever an LSP is carried by other LSPs (i.e., a label stack depth larger than one), pinpointing the failure in the upper LSP space requires further manual intervention. In particular, consider the case of a Label Distribution Protocol (LDP) LSP which traverses a traffic engineering (TE) tunnel for which a Fast ReRoute (FRR) back tunnel is active. In cases where the FRR backup tunnel is down, sending an LSP ping for the LDP LSP may not immediately pinpoint the failure as being in the FRR backup tunnel.

In addition, it is desirable to gather various statistics related to the LSP upper in the hierarchy. For example, in the case of hierarchical Traffic Engineering, when a child LSP (cLSP) is carried onto a parent LSP (pLSP), it is useful to gather path quality statistics individually for the cLSP and pLSP, a critical aspect when using hierarchical TE. For example, it is useful to determine the latency of not only the top level of the LSP hierarchy, but also the latency introduced by each other level. Other statistics such as the path cost, level of protection, and the like may be useful so as to potentially trigger some appropriate action such as rerouting or switching the Traffic Engineering LSP type (for example, from stitched to contiguous TE LSP as defined in draft-ietf-ccamp-inter-domain-rsvp-te-01.txt).

Conventional technologies for troubleshooting a failed LSP increase the time-to-live (TTL) of the top-most label in order to progressively probe further and further along the path of the LSP. Embodiments of the invention modify this method so that the range of all labels in the label stack is traversed to determine the exact location of the LSP failure. Note that the TTL values of each label in the label stack may be different; in other words, the TTL values of a label corresponding to the layer in the hierarchy being evaluated is traversed, and all hierarchies selectable by the initial router are evaluated. For each Multiprotocol Label Switching (MPLS) echo request that is returned, the TTL expired packets are parsed to determine if a load balancing prevention identifier (LBPI), such as a pseudowire control word, is present. Subsequently, LSP ping packets contained therein are processed. Thus, embodiments of the invention identify failure locations and gather path quality statistics within an LSP hierarchy, including those that use pseudowires.

More particularly, in an embodiment there is provided a method of exploring a label switched path hierarchy in a network comprising a plurality of routers and links interconnecting the routers, wherein the protocol used to setup one or more label switched paths between the plurality of routers is multipath label switching protocol, wherein the hierarchy includes a number of layers, and wherein the label switched path corresponds to a path used by a class of packets. The method includes: transmitting a path verification message from an initial router along a path, wherein a label stack of the path verification message includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; in response, receiving an reply message, wherein the reply message indicates that the path verification message reached its destination; and in response, repeating the steps of transmitting a path verification message and receiving a reply message, wherein: for each successive path verification message transmitted in response to a received reply message, incrementing the time-to-live field associated with a label corresponding to the current layer in the hierarchy, so that the path verification message travels to the next hop in the path; if any received reply message indicates that a destination router was reached, terminating the transmitting of path verification messages and the receiving of reply messages; for any received reply message that includes information describing a layer in the hierarchy that is different from the current layer, modifying the label stack of the next transmitted path verification message and incrementing the time-to-live field of the label in the label stack corresponding to the described different layer, wherein the values for any time-to-live fields associated with other labels in the label stack remain unchanged.

In a related embodiment, repeating may include: if any received reply message is a failure reply message, wherein a failure reply message indicates that a transmitted path verification message did not reach its destination, terminating the transmitting of path verification messages and the receiving of reply messages; and wherein the method may further include: tracking any transmitted path verification message that results in a failure reply message; and processing the information contained within any tracked transmitted message and any received failure reply message to determine the location of an error in the hierarchy. In a further related embodiment, the method may include determining if any tracked transmitted message includes a load balancing prevention identifier.

In another related embodiment, repeating may further include: for any sequence of transmitted path verification messages and received reply messages, gathering at least one path quality statistic of interest concerning the path. In a further related embodiment wherein the label switched path may be a contiguous label switched path and the hierarchy includes a child layer and a parent layer, transmitting may include: transmitting a path verification message from an initial router of the child layer along a path, wherein a label stack of the path verification message includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; and the method may include after gathering at least one path quality statistic of interest for the parent layer, choosing, at the initial router of the child layer, to transmit messages on a path different from the parent layer.

In another further related embodiment, wherein the label switched path may be a contiguous label switched path and the hierarchy includes a child layer and a parent layer, transmitting may include: transmitting a path verification message from an initial router of the child layer along a path, wherein a label stack of the path verification message includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; and the method may include after gathering at least one path quality statistic of interest for the parent path, sending instructions from the initial router of the child layer to an initial router of the parent layer, wherein the instructions cause the initial router of the parent layer to route all messages received from the child layer to a path different from the parent path.

In yet another further related embodiment, a plurality of label switched paths may be combined to form a stitched label switched path, wherein each label switched path in the plurality has a hierarchy, and the method may include: repeating the steps of transmitting, receiving, repeating, and gathering for each label switched path in the plurality of label switched paths.

In another embodiment there is provided a computer program product, stored on a computer readable medium, for exploring a label switched path hierarchy, wherein the hierarchy includes a number of layers, and wherein the label switched path corresponds to a path used by a class of packets. The computer program product operates on a network comprising a plurality of routers and links interconnecting the routers, wherein the protocol used to setup one or more label switched paths between the plurality of routers is multipath label switching protocol. The computer program product includes computer program code for transmitting a path verification message from an initial router along a path, wherein a label stack of the path verification message includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; in response, computer program code for receiving an reply message, wherein the reply message indicates that the path verification message reached its destination; and in response, computer program code for repeating the steps of transmitting a path verification message and receiving a reply message, wherein: for each successive path verification message transmitted in response to a received reply message, computer program code for incrementing the time-to-live field associated with a label corresponding to the current layer in the hierarchy, so that the path verification message travels to the next hop in the path; if any received reply message indicates that a destination router was reached, computer program code for terminating the transmitting of path verification messages and the receiving of reply messages; for any received reply message that includes information describing a layer in the hierarchy that is different from the current layer, computer program code for modifying the label stack of the next transmitted path verification message and computer program code for incrementing the time-to-live field of the label in the label stack corresponding to the described different layer, wherein the values for any time-to-live fields associated with other labels in the label stack remain unchanged.

In another embodiment there is provided a computer system. The computer system includes a memory, a processor, a communications interface, through which the computer is coupled to a network, the network comprising a plurality of routers and links interconnecting the routers, wherein the protocol used to setup one or more label switched paths between the plurality of routers is multipath label switching protocol, and an interconnection mechanism coupling the memory, the processor and the communications interface, allowing communication there between. The memory is encoded with a hierarchy exploration application, that when executed in the processor, provides a hierarchy exploration process that explores a label switched path hierarchy, wherein the hierarchy includes a number of layers, and wherein the label switched path corresponds to a path used by a class of packets, by causing the computer system to perform the operations of: transmitting a path verification message from an initial router along a path, wherein a label stack of the path verification message includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; in response, receiving an reply message, wherein the reply message indicates that the path verification message reached its destination; and in response, repeating the steps of transmitting a path verification message and receiving a reply message, wherein: for each successive path verification message transmitted in response to a received reply message, incrementing the time-to-live field associated with a label corresponding to the current layer in the hierarchy, so that the path verification message travels to the next hop in the path; if any received reply message indicates that a destination router was reached, terminating the transmitting of path verification messages and the receiving of reply messages; for any received reply message that includes information describing a layer in the hierarchy that is different from the current layer, modifying the label stack of the next transmitted path verification message and incrementing the time-to-live field of the label in the label stack corresponding to the described different layer, wherein the values for any time-to-live fields associated with other labels in the label stack remain unchanged.

Arrangements of the invention involving a computer program product are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that the embodiments of the invention may be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and 3B illustrate a flowchart of a procedure preformed by the computer system depicted in FIG. 1 when detecting an error in a hierarchy of a label switched path while exploring the hierarchy.

FIGS. 5A and 5B illustrate a flowchart of a procedure performed by the computer system depicted in FIG. 1 when gathering at least one path quality statistic of interest while exploring the hierarchy and using that information to make routing decisions among a child layer and a parent layer in the hierarchy.

DETAILED DESCRIPTION

Figure 1:
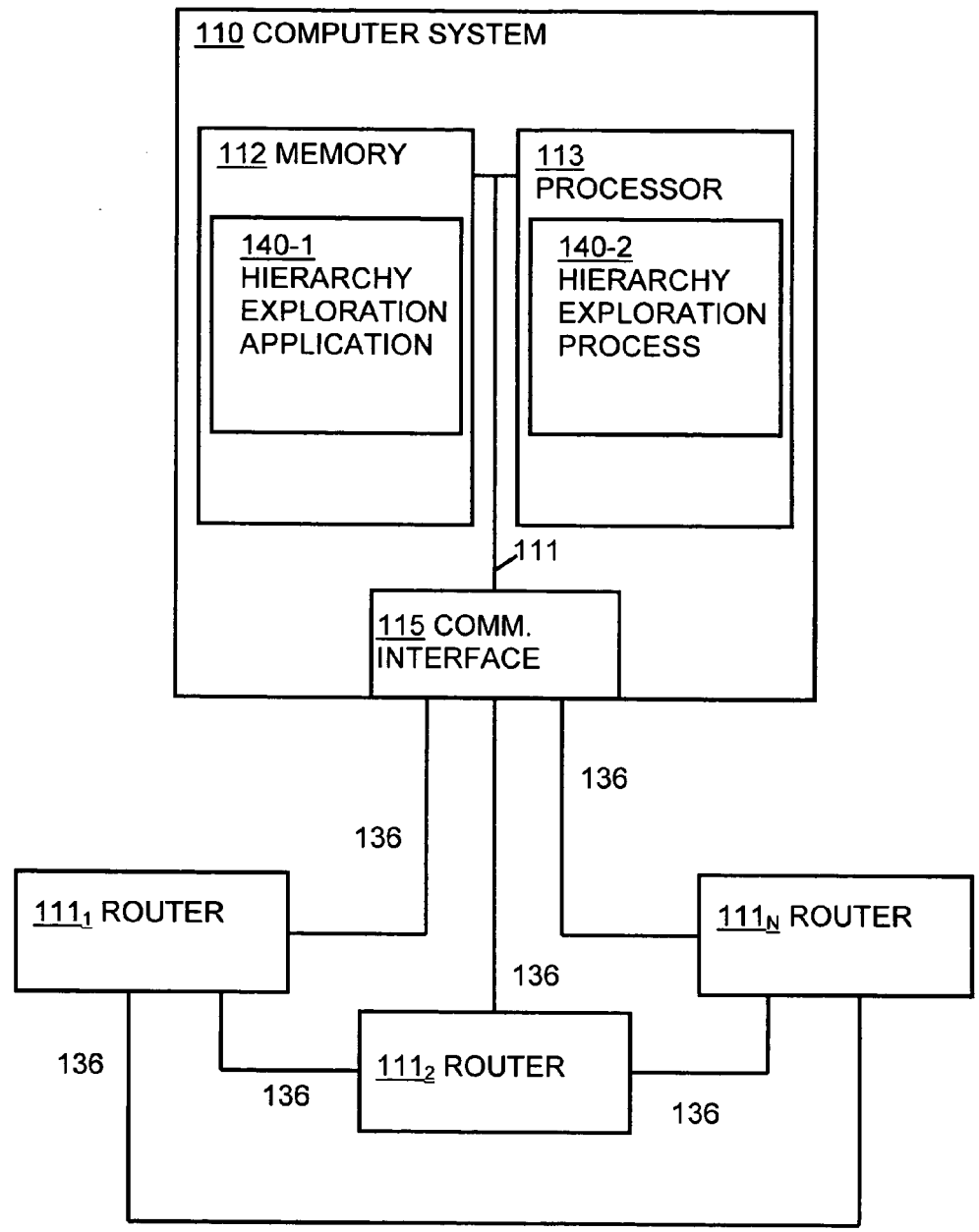
FIG. 1 illustrates an example computer system architecture for a computer system according to one embodiment disclosed herein.

To verify the end-to-end connectivity of a label switched path (LSP) for the entire hierarchy of LSPs over which the given LSP is transported, embodiments of the invention. Embodiments also allow the diagnosis of which layer, node and link within an LSP hierarchy is faulty by automatically verifying each layer of the hierarchy, as described below, when exploring the hierarchy. Embodiments also allow for the reporting of path quality statistics of each LSP in the hierarchy, as described below. More particularly, FIG. 1 is a block diagram illustrating an example architecture of a computer system 110 that executes, runs, interprets, operates or otherwise performs a hierarchy exploration application 140-1 and a hierarchy exploration process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, and a communications interface 115. The communications interface 115 enables the computer system 110 to communicate with other devices, such as routers $111_1$, $111_2$, ... $111_N$, which are connected to the computer system 110 via links 136 to form a network. The network depicted in FIG. 1 is just one example of many network topologies that the computer system 110 may be a part of. The links 136 may be physical links, or may be non-physical links such as but not limited to wireless communication, or may represent the transmission of datagrams from one network component to another. Further, the computer system 110 depicted in FIG. 1 may be a router or any other type of network component capable of executing the hierarchy exploration application 140-1 as the hierarchy exploration process 140-2 and carrying out that process, as is described below.

The memory system 112 is any type of computer readable medium and in this example is encoded with a hierarchy exploration application 140-1 that includes hierarchy exploration process 140-2. The hierarchy exploration application 140-1 may be embodied as software code such as data and/or logic instructions (e.g., code stored in the memory system 112 or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the hierarchy exploration application 140-1. Execution of the hierarchy exploration application 140-1 in this manner produces processing functionality in a hierarchy exploration process 140-2. In other words, the hierarchy exploration process 140-2 represents one or more portions or runtime instances of the hierarchy exploration application 140-1 performing or executing within or upon the processor 113 in the computer system 110 at runtime.

It is noted that example configurations disclosed herein include the hierarchy exploration application 140-1 itself including the hierarchy exploration process 140-2 (i.e., in the form of un-executed or non-performing logic instructions and/or data). The hierarchy exploration application 140-1 may be stored on a computer readable medium (such as a floppy disk), hard disk, electronic, magnetic, optical or other computer readable medium. The hierarchy exploration application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the hierarchy exploration application 140-1 in the processor 113 as the hierarchy exploration process 140-2. Those skilled in the art will understand that the computer system 110 may include other processes and/or software and hardware components, such as an operating system not shown in this example.

A number of flowcharts of the presently disclosed method are illustrated in FIGS. 2-6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

More specifically, FIGS. 2-6 illustrate flowcharts of a method to explore a hierarchical label switched path through use of the hierarchy exploration process 140-2. Such a path is typically found in a network of routers and links interconnecting the routers that transmit messages using multipath label switching protocol. During exploration of the path, it may be desirable to gather one or more path quality statistics of interest, to assist in making decisions regarding routing. Alternatively, or in addition, an error may have occurred at some point in the hierarchy, and during exploration of the path, it may be possible to detect the exact location of that error. For example, when a class of packets is transmitted over the network on a hierarchical label switched path, if the packets do not reach their destination in the network, this may indicate an error or other type of failure present somewhere in the hierarchy, which may be discovered as discussed below.

Figure 2:
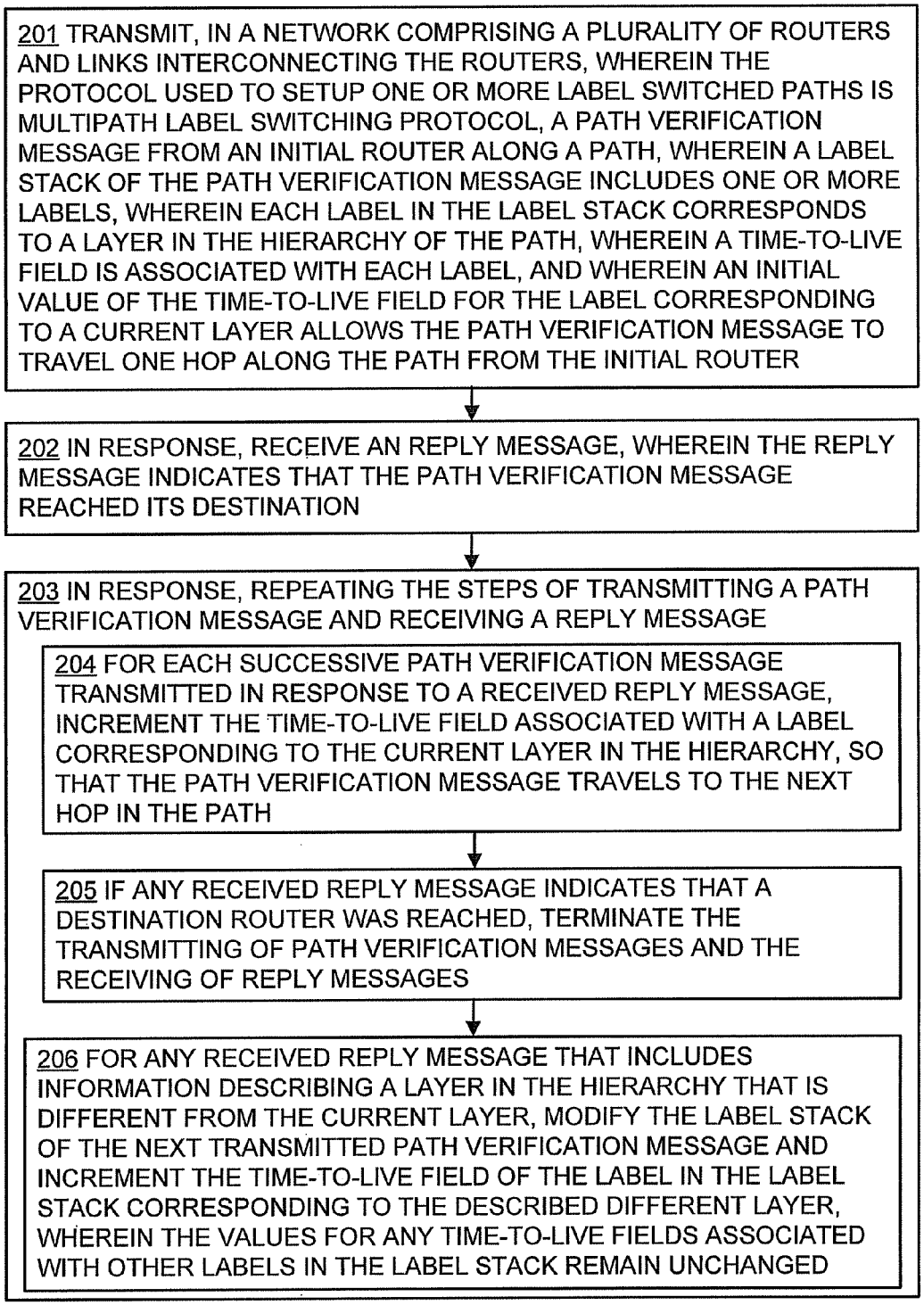
FIG. 2 illustrates a flowchart of a procedure performed by the computer system depicted in FIG. 1 when exploring a hierarchy of a label switched path.

More particularly, to explore such a path, in FIG. 2 the hierarchy exploration process 140-2 transmits a path verification message from an initial router along a path, step 201. The initial router may be, but is not limited to, a router at the head-end of the label switched path. A label stack of the path verification message includes one or more labels, wherein each label in the label stack corresponds to a layer in the hierarchy of the path. The hierarchy exploration process 140-2 learns the number of layers in the hierarchy through use of a control plane protocol such as but not limited to Label Distribution Protocol, (LDP), Resource Reservation Protocol (RSVP), or Border Gateway Protocol (BGP), or the router or other device on which the hierarchy exploration process 140-2 executes may be configured with the information. In the path verification message, the hierarchy exploration process 140-2 associates a time-to-live field with each label, and sets an initial value of the time-to-live field for the label corresponding to a current layer so that the path verification message travels one hop along the path from the initial router. In response to transmitting the path verification message, the hierarchy exploration process 140-2 receives a reply message, step 202. The reply message indicates that the path verification message transmitted by the hierarchy exploration process 140-2 reached its destination. A reply message may also include information about if the path verification message did not reach its destination, as is discussed further below. When a reply message is from a router that is not a destination of packets belonging to a class of packets, additional information is supplied, which may include a return code indicating whether or not the router is a transit router along the path, as well as information about the label stack of the received verification message and candidate output paths that a packet or message may be transmitted on.

In response to receiving this reply message, the hierarchy exploration process 140-2 repeats the steps of transmitting a path verification message and receiving a reply message, step 203. The hierarchy exploration process 140-2 follows certain rules when repeating the steps. For each successive path verification message transmitted by the hierarchy exploration process 140-2 in response to a received reply message, the hierarchy exploration process 140-2 increments the time-to-live field associated with a label corresponding to the current layer in the hierarchy, step 204. The hierarchy exploration process 140-2 increments the time-to-live field in this manner so that the path verification message travels to the next hop in the path. If any reply message received by the hierarchy exploration process 140-2 indicates that a destination router was reached, the hierarchy exploration process 140-2 terminates the transmitting of path verification messages and the receiving of reply messages, step 205. For any reply message received by the hierarchy exploration process 140-2 that includes information describing a layer in the hierarchy that is different from the current layer, the hierarchy exploration process 140-2 modifies the label stack of the next transmitted path verification message and increments the time-to-live field of the label in the label stack corresponding to the described different layer, step 206. The values for any time-to-live fields associated with other labels in the label stack remain unchanged by the hierarchy exploration process 140-2. This allows the hierarchy exploration process 140-2 to explore a label switched path hierarchy of multiple layers, regardless of the number of layers present in the hierarchy.

Figure 3B:
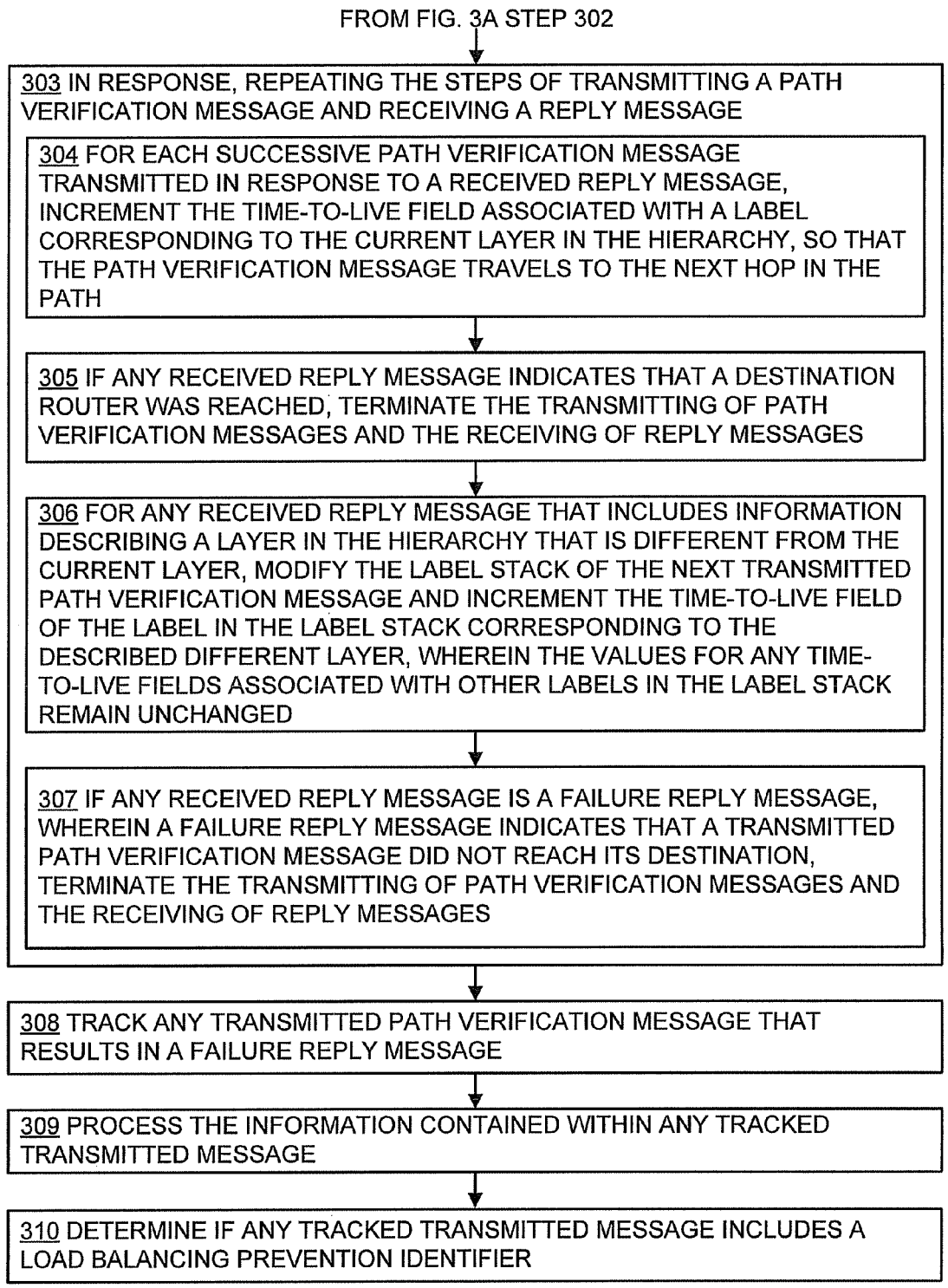

The methodology discussed above may be modified to detect the location of an error in the hierarchy while exploring the hierarchy, as shown in FIGS. 3A and 3B. For example, during a typical transmission of a class of packets over the hierarchy, the end destination for the class of packets may never receive any of the packets, indicating that an error may be present in the hierarchy. To detect that error, the hierarchy exploration process 140-2 again transmits a path verification message from an initial router along a path, step 301, where a label stack of the path verification message includes one or more labels, wherein each label in the label stack corresponds to a layer in the hierarchy of the path. In the path verification message, the hierarchy exploration process 140-2 associates a time-to-live field with each label, and sets an initial value of the time-to-live field for the label corresponding to a current layer so that the path verification message travels one hop along the path from the initial router. In response to transmitting the path verification message, the hierarchy exploration process 140-2 receives a reply message, step 302. The reply message indicates that the path verification message transmitted by the hierarchy exploration process 140-2 reached its destination. The hierarchy exploration process 140-2 then repeats the steps of transmitting a path verification message and receiving a reply message, step 303. The hierarchy exploration process 140-2 follows the rules discussed above when repeating the steps: for each successive path verification message transmitted by the hierarchy exploration process 140-2 in response to a received reply message, the hierarchy exploration process 140-2 increments the time-to-live field associated with a label corresponding to the current layer in the hierarchy, step 304, so that the path verification message travels to the next hop in the path. If any reply message received by the hierarchy exploration process 140-2 indicates that a destination router was reached, the hierarchy exploration process 140-2 terminates the transmitting of path verification messages and the receiving of reply messages, step 305. However, in this instance, unless the error in the hierarchy was detected in another way and otherwise repaired, no reply message received by the hierarchy exploration process 140-2 should indicate that a destination router was reach. For any reply message received by the hierarchy exploration process 140-2 that includes information describing a layer in the hierarchy that is different from the current layer, the hierarchy exploration process 140-2 modifies the label stack of the next transmitted path verification message and increments the time-to-live field of the label in the label stack corresponding to the described different layer, step 306, with the values for any time-to-live fields associated with other labels in the label stack remain unchanged by the hierarchy exploration process 140-2.

In addition to the rule associated strictly with exploring the hierarchy, to detect an error and its location, the hierarchy exploration process 140-2 includes another rule. If any reply message received by the hierarchy exploration process 140-2 is a failure reply message that indicates that a transmitted path verification message did not reach its destination, the hierarchy exploration process 140-2 terminates the transmitting of path verification messages and the receiving of reply messages, step 307, as receiving this type of message should indicate that the location of the error has been found. This includes the first reply message received by the hierarchy exploration process 140-2 in response to the transmission of the first path verification message by the hierarchy exploration process 140-2. In other words, it may be possible for the first path verification message transmitted by the hierarchy exploration process 140-2 to result in a failure reply message being received, which might indicate that the first hop in the path is the location of the error.

The hierarchy exploration process 140-2 tracks any transmitted path verification message that results in a failure reply message, step 308, and processes the information contained within any tracked transmitted message and any received failure reply message to determine the location of an error in the hierarchy, step 309. Additionally, the hierarchy exploration process 140-2 may determine if any tracked transmitted message includes a load balancing prevention identifier.

Figure 4:
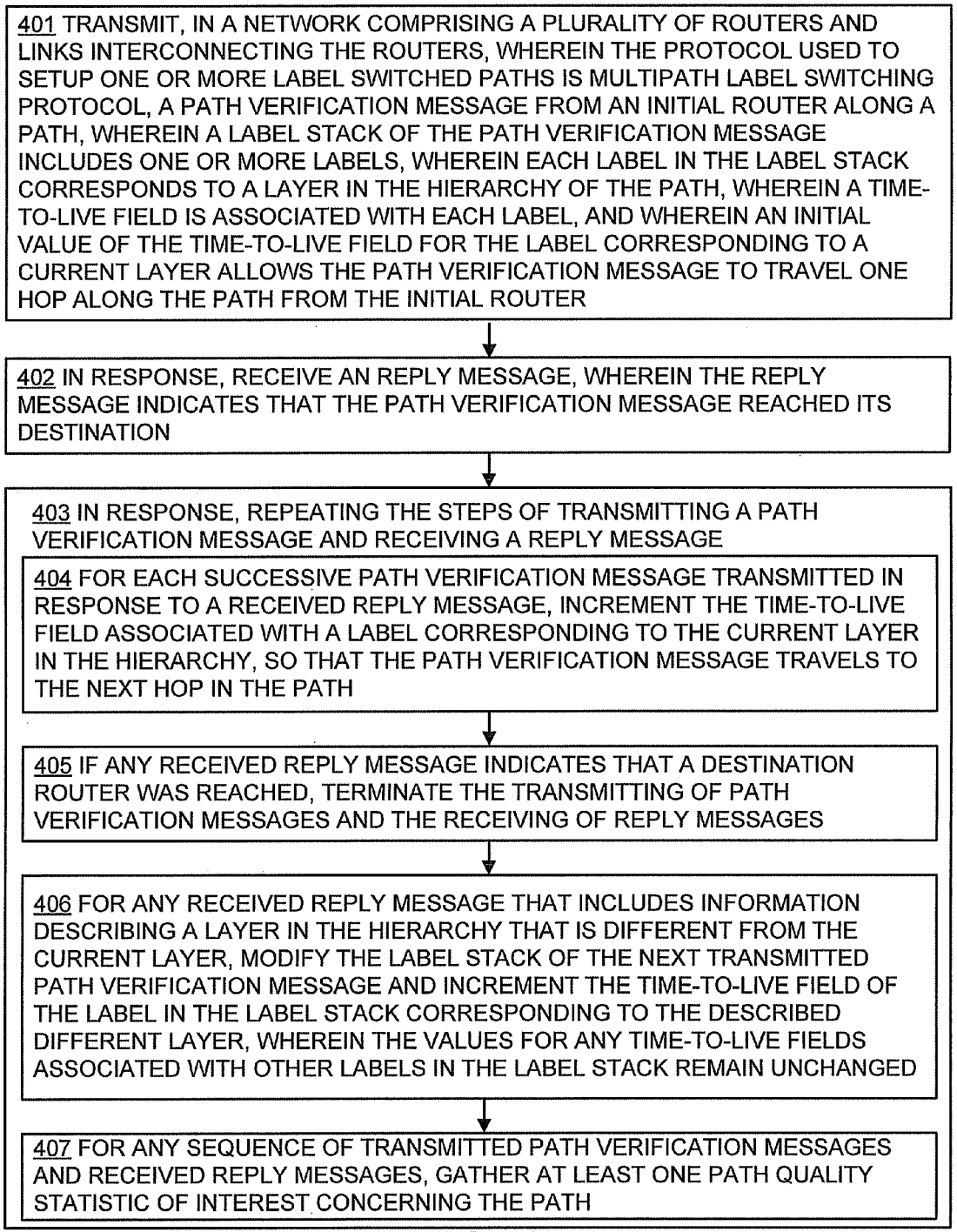
FIG. 4 illustrates a flowchart of a procedure performed by the computer system depicted in FIG. 1 when gathering at least one path quality statistic of interest from the hierarchy while exploring the hierarchy.
Figure 5B:
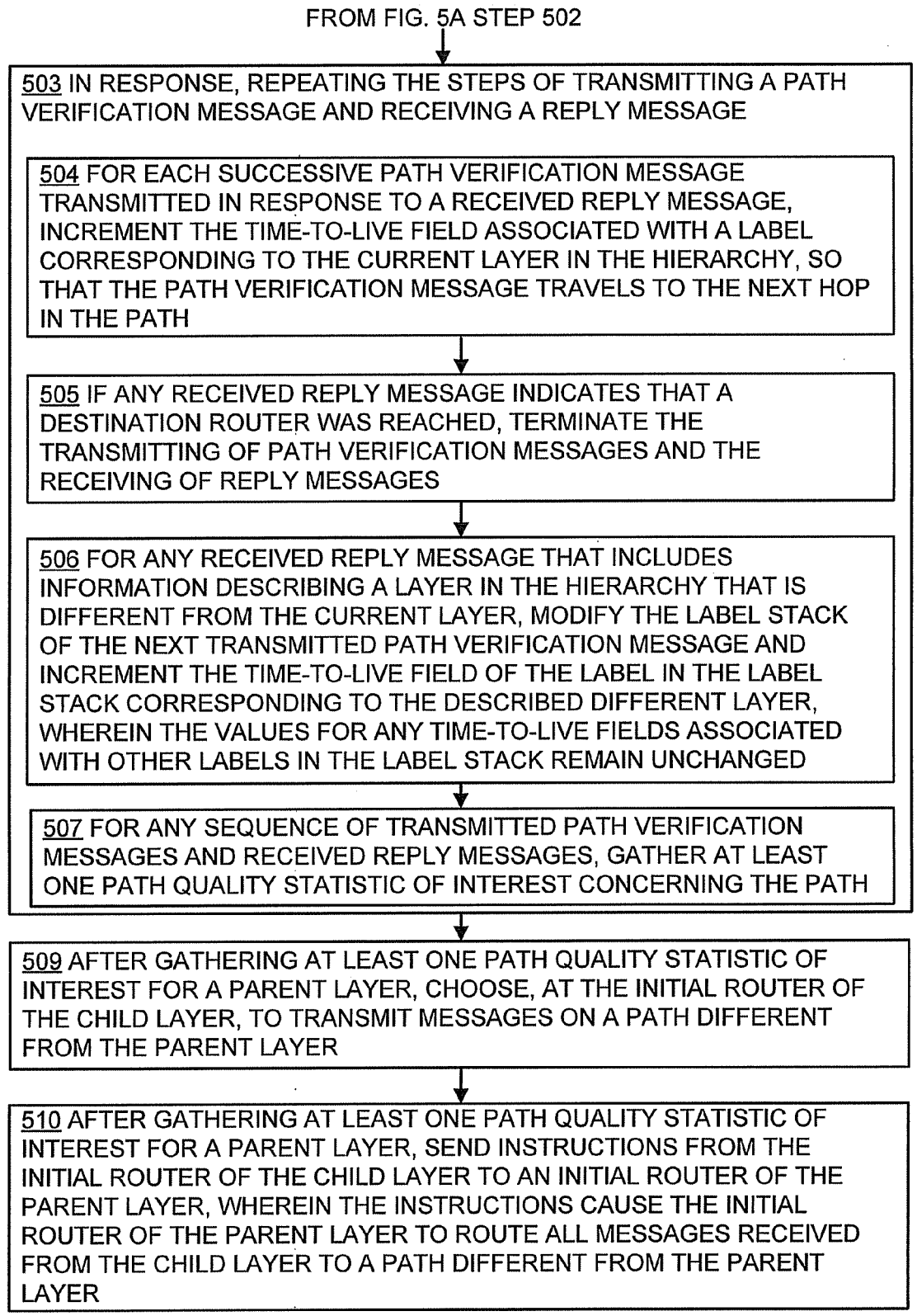

The hierarchy exploration methodology discussed above may also be modified to gather one or more path quality statistics of interest, as shown in FIG. 4. For example, during a typical transmission of a class of packets over the hierarchy, it may be desirable to know something about the path, such as but not limited to quality statistics like latency or jitter, to help make better routing decisions. To gather such a quality statistic, the hierarchy exploration process 140-2 again transmits a path verification message from an initial router along a path, step 401, where to a label stack of the path verification message includes one or more labels, wherein each label in the label stack corresponds to a layer in the hierarchy of the path. In the path verification message, the hierarchy exploration process 140-2 associates a time-to-live field with each label, and sets an initial value of the time-to-live field for the label corresponding to a current layer so that the path verification message travels one hop along the path from the initial router. In response to transmitting the path verification message, the hierarchy exploration process 140-2 receives a reply message, step 402. The reply message indicates that the path verification message transmitted by the hierarchy exploration process 140-2 reached its destination. The hierarchy exploration process 140-2 then repeats the steps of transmitting a path verification message and receiving a reply message, step 403. The hierarchy exploration process 140-2 follows the rules discussed above when repeating the steps: for each successive path verification message transmitted by the hierarchy exploration process 140-2 in response to a received reply message, the hierarchy exploration process 140-2 increments the time-to-live field associated with a label corresponding to the current layer in the hierarchy, step 404, so that the path verification message travels to the next hop in the path. If any reply message received by the hierarchy exploration process 140-2 indicates that a destination router was reached, the hierarchy exploration process 140-2 terminates the transmitting of path verification messages and the receiving of reply messages, step 405. For any reply message received by the hierarchy exploration process 140-2 that includes information describing a layer in the hierarchy that is different from the current layer, the hierarchy exploration process 140-2 modifies the label stack of the next transmitted path verification message and increments the time-to-live field of the label in the label stack corresponding to the described different layer, step 406, with the values for any time-to-live fields associated with other labels in the label stack remain unchanged by the hierarchy exploration process 140-2. To gather one or more path quality statistics of interest, the hierarchy exploration process 140-2 includes an additional rule, namely that for any sequence of transmitted path verification messages and received reply messages, the hierarchy exploration process 140-2 gathers at least one path quality statistic of interest concerning the path, step 407.

By gathering this information, decisions regarding routing may be made. For example, if the label switched path is a contiguous label switched path and the hierarchy includes a child layer and a parent layer, the hierarchy exploration process 140-2 transmits a path verification message from an initial router of the child layer along a path, step 508. A label stack of the path verification message includes one or more labels, and each label in the label stack corresponds to a layer in the hierarchy of the path. A time-to-live field is associated with each label, and the hierarchy exploration process 140-2 sets an initial value of the time-to-live field for the label corresponding to a current layer so as to allow the path verification message to travel one hop along the path from the initial router. In response to transmitting the path verification message, the hierarchy exploration process 140-2 receives a reply message, step 502. The reply message indicates that the path verification message transmitted by the hierarchy exploration process 140-2 reached its destination.

The hierarchy exploration process 140-2 then repeats the steps of transmitting a path verification message and receiving a reply message, step 503. The hierarchy exploration process 140-2 follows the rules discussed above when repeating the steps: for each successive path verification message transmitted by the hierarchy exploration process 140-2 in response to a received reply message, the hierarchy exploration process 140-2 increments the time-to-live field associated with a label corresponding to the current layer in the hierarchy, step 504, so that the path verification message travels to the next hop in the path. If any reply message received by the hierarchy exploration process 140-2 indicates that a destination router was reached, the hierarchy exploration process 140-2 terminates the transmitting of path verification messages and the receiving of reply messages, step 505. For any reply message received by the hierarchy exploration process 140-2 that includes information describing a layer in the hierarchy that is different from the current layer, the hierarchy exploration process 140-2 modifies the label stack of the next transmitted path verification message and increments the time-to-live field of the label in the label stack corresponding to the described different layer, step 506, with the values for any time-to-live fields associated with other labels in the label stack remain unchanged by the hierarchy exploration process 140-2. The hierarchy exploration process 140-2 also, for any sequence of transmitted path verification messages and received reply messages, gathers at least one path quality statistic of interest concerning the path, step 507. After gathering at least one path quality statistic of interest for the parent layer, and analyzing that gathered data, a decision may be made at the initial router of the child layer to transmit messages on a path different from the parent layer, step 509. Alternatively, after gathering at least one path quality statistic of interest for the parent layer, a decision may be made to send instructions from the initial router of the child layer to an initial router of the parent layer, step 510. The instructions sent cause the initial router of the parent layer to route all messages received from the child layer to a path different from the parent path.

Figure 6:
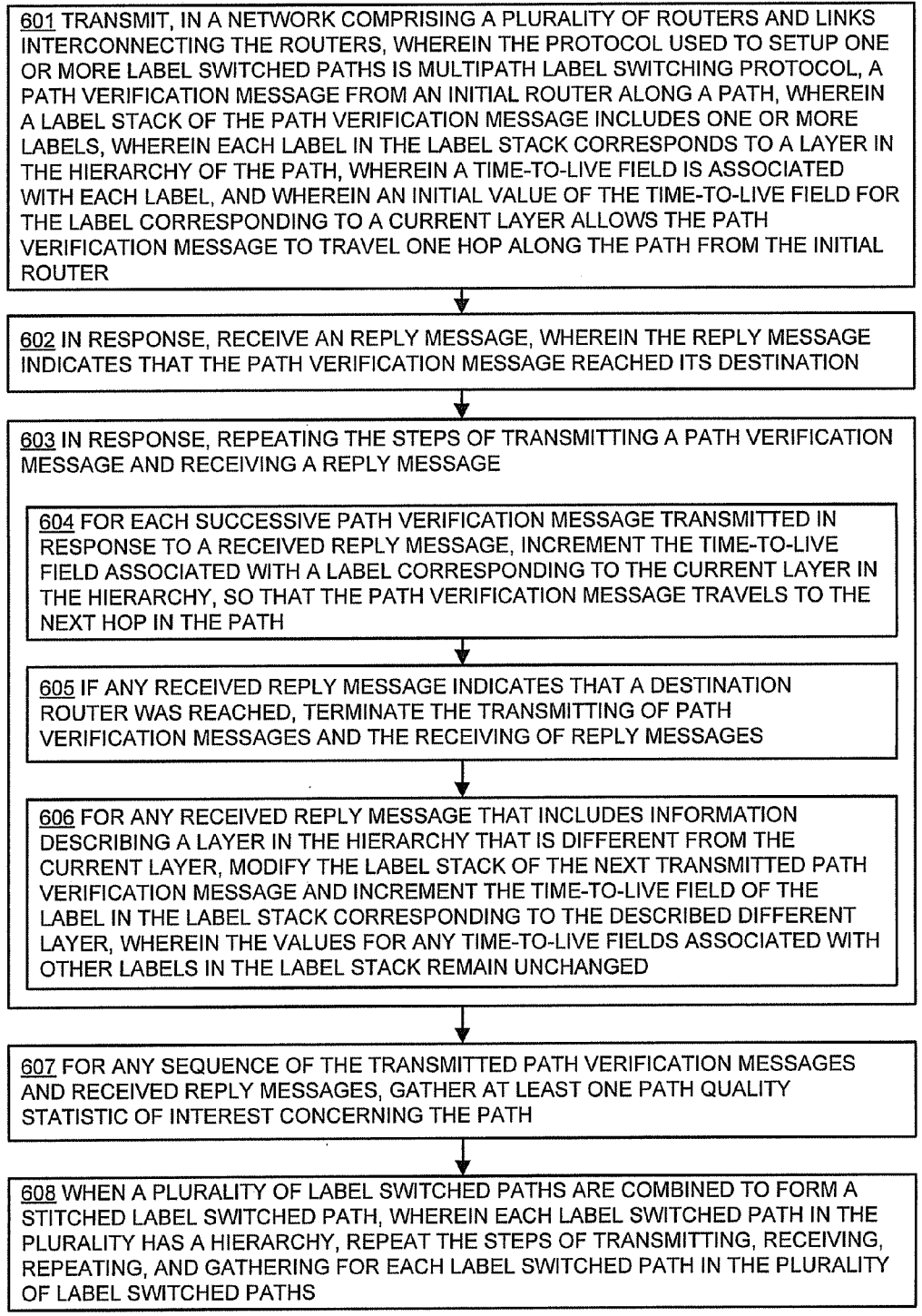
FIG. 6 illustrates a flowchart of a procedure performed by the computer system depicted in FIG. 1 when gathering at least one path quality statistic of interest from a plurality of stitched label switched paths while exploring the paths.

When a plurality of label switched paths are stitched together to form a stitched label switched path, the stitched label switched path may be explored, and path quality statistics may be gathered by using another modification of the basic exploration methodology, as shown in FIG. 6. The hierarchy exploration process 140-2 again transmits a path verification message from an initial router along a path, step 601, where a label stack of the path verification message includes one or more labels, wherein each label in the label stack corresponds to a layer in the hierarchy of the path. In the path verification message, the hierarchy exploration process 140-2 associates a time-to-live field with each label, and sets an initial value of the time-to-live field for the label corresponding to a current layer so that the path verification message travels one hop along the path from the initial router. In response to transmitting the path verification message, the hierarchy exploration process 140-2 receives a reply message, step 602. The reply message indicates that the path verification message transmitted by the hierarchy exploration process 140-2 reached its destination. The hierarchy exploration process 140-2 then repeats the steps of transmitting a path verification message and receiving a reply message, step 603. The hierarchy exploration process 140-2 follows the rules discussed above when repeating the steps: for each successive path verification message transmitted by the hierarchy exploration process 140-2 in response to a received reply message, the hierarchy exploration process 140-2 increments the time-to-live field associated with a label corresponding to the current layer in the hierarchy, step 604, so that the path verification message travels to the next hop in the path. If any reply message received by the hierarchy exploration process 140-2 indicates that a destination router was reached, the hierarchy exploration process 140-2 terminates the transmitting of path verification messages and the receiving of reply messages, step 605. For any reply message received by the hierarchy exploration process 140-2 that includes information describing a layer in the hierarchy that is different from the current layer, the hierarchy exploration process 140-2 modifies the label stack of the next transmitted path verification message and increments the time-to-live field of the label in the label stack corresponding to the described different layer, step 606, with the values for any time-to-live fields associated with other labels in the label stack remain unchanged by the hierarchy exploration process 140-2. To gather one or more path quality statistics of interest, as discussed above, the hierarchy exploration process 140-2 includes an additional rule, namely that for any sequence of transmitted path verification messages and received reply messages, the hierarchy exploration process 140-2 gathers at least one path quality statistic of interest concerning the path, step 607. The hierarchy exploration process 140-2 repeats each of the steps of transmitting, receiving, repeating, and gathering for each label switched path in the plurality of label switched paths, step 608.

It should be noted that situations may arise where time-to-live propagation settings at a mid-point ingress to a higher level LSP hierarchy prevent the router executing the hierarchy exploration process 140-2 from performing the path verification directly from the head end. In such cases, a user would either need to perform this verification manually, or ensure that the mid-point router in question supports proxy path verification operations, in a fashion similar to what is described in draft-swallow-mpls-remote-lsp-ping-00.txt. Such a methodology is described in co-pending U.S. patent application Ser. No. 11/537,244, filed on Sep. 29, 2006, entitled "Directed Echo Request and Reverse Traceroute", the entire contents of which are hereby incorporated herein by reference.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system;

however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the interne and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. In a network comprising a plurality of routers and links interconnecting the routers, wherein a protocol used to setup one or more label switched paths between the plurality of routers is multipath label switching protocol, a method of exploring a label switched path hierarchy, wherein the hierarchy includes a plurality of layers, wherein each layer of the plurality of layers is configured to support at least one respective label switched path, wherein each label switched path corresponds to at least one path used by a class of packets, the method comprising:

transmitting a path verification message from an initial router downstream along a path, wherein a label stack of the path verification message includes a plurality of labels, wherein each label of the plurality of labels in the label stack corresponds to a layer of the plurality of layers in the hierarchy of the path, wherein each label of the plurality of labels is associated with a time-to-live field of a plurality of time-to-live fields, wherein a first label of the plurality of labels corresponds to a first layer of the plurality of layers, wherein the first label is associated with a first time-to-live field of the plurality of time-to-live fields, wherein the first layer comprises a current layer, and wherein an initial value of the first time-to-live field for the first label corresponding to the current layer allows the path verification message to travel one hop along the path from the initial router;

in response, receiving a reply message transmitted upstream along the path, wherein the reply message includes information indicating whether the path verification message reached its destination, and wherein the reply message is configured to include at least one alternative path to the path when the reply message is from a router, along the path, other than a destination router;

in response:

determining whether the reply message includes information describing a second layer, the second layer being a layer in the hierarchy that is different from the first layer and corresponding to a second label of the plurality of labels;

in response to determining that the reply message does not include information that describes the second layer, incrementing the first time-to-live field associated with the first label corresponding to the first layer; and in response to determining that the reply message includes information that describes the second layer:

modifying the label stack of a next transmitted path verification message; and incrementing a second time-to-live field of the plurality of time-to-live fields, the second time-to-live field being associated with the second label and being different from the first time-to-live field.

2. A computer system comprising:

a memory;

a processor;

a communications interface, through which the computer system is coupled to a network, the network comprising a plurality of routers and links interconnecting the routers, wherein a multipath label switching protocol is used to setup one or more label switched paths between the plurality of routers;

an interconnection mechanism coupling the memory, the processor and the communications interface, allowing communication there between;

wherein the memory is encoded with a hierarchy exploration application, that when executed in the processor, provides a hierarchy exploration process that explores a label switched path hierarchy, wherein the hierarchy includes a plurality of layers, wherein each layer of the plurality of layers is configured to support at least one respective label switched path, and wherein each label switched path corresponds to at least one path used by a class of packets, by causing the computer system to perform the operations of:

transmitting a path verification message from an initial router downstream along a path, wherein a label stack of the path verification message includes a plurality of labels, wherein each label of the plurality of labels in the label stack corresponds to a layer of the plurality of layers in the hierarchy of the path, wherein each label of the plurality of labels is associated with a time-to-live field of a plurality of time-to-live fields, wherein a first label of the plurality of labels corresponds to a first layer of the plurality of layers, wherein the first label is associated with a first time-to-live field of the plurality of time-to-live fields, wherein the first layer comprises a current layer, and wherein an initial value of the first time-to-live field for the first label corresponding to the current layer allows the path verification message to travel one hop along the path from the initial router;

in response, receiving a reply message transmitted upstream along the path, wherein the reply message includes information of whether the path verification message reached its destination, and wherein the reply message is configured to include at least one alternative path to the path when the reply message is from a router, along the path, other than a destination router;

in response:

determining whether the reply message includes information describing a second layer, the second layer being a layer in the hierarchy that is different from the first layer and corresponding to a second label of the plurality of labels;

in response to determining that the reply message does not include information that describes the second layer, incrementing the first time-to-live field associated with the first label corresponding to the first layer; and in response to determining that the reply message includes information that describes the second layer: modifying the label stack of a next transmitted path verification message; and incrementing a second time-to-live field of the plurality of time-to-live fields, the second time-to-live field being associated with the second label and being different from the first time-to-live field.

3. In a network comprising a plurality of routers and links interconnecting the routers, wherein a multipath label switching protocol is used to setup one or more label switched paths between the plurality of routers, a computer program embodied in a non-transitory computer-readable medium for exploring a label switched path hierarchy, wherein the hierarchy includes a number of layers, wherein each layer is configured to support at least one respective label switched path, and wherein each label switched path corresponds to at least one path used by a class of packets, the computer-readable non-transitory medium comprising:

computer program code for transmitting a path verification message from an initial router downstream along a path, wherein a label stack of the path verification message includes a plurality of labels, wherein each label of the plurality of labels in the label stack corresponds to a layer of the plurality of layers in the hierarchy of the path, wherein each label of the plurality of labels is associated with a time-to-live field of a plurality of time-to-live fields, wherein a first label of the plurality of labels corresponds to a first layer of the plurality of layers, wherein the first label is associated with a first time-to-live field of the plurality of time-to-live fields, wherein the first layer comprises a current layer, and wherein an initial value of the first time-to-live field for the first label corresponding to the current layer allows the path verification message to travel one hop along the path from the initial router;

in response, computer program code for receiving a reply message transmitted upstream along the path, wherein the reply message includes information related to whether the path verification message reached its destination, and wherein the reply message is configured to include at least one alternative path to the path when the reply message is from a router, along the path, other than a destination router; and in response:

computer code for determining whether the reply message includes information describing a second layer, the second layer being a layer in the hierarchy that is different from the first layer and corresponding to a second label of the plurality of labels;

in response to determining that the reply message does not include information that describes the second layer, computer code for incrementing the first time-to-live field associated with the first label corresponding to the first layer; and in response to determining that the reply message includes information that describes the second layer, computer code for:

modifying the label stack of a next transmitted path verification; and incrementing a second time-to-live field of the plurality of time-to-live fields, the second time-to-live field being associated with the second label and being different from the first time-to-live field.

4. The method of claim 1, further comprising:

repeating the steps of transmitting a path verification message and receiving a reply message, wherein:

for each successive path verification message transmitted in response to a received reply message, incrementing a time-to-live field of the plurality of time-to-live fields that is associated with a label corresponding to the current layer in the hierarchy, so that the path verification message travels to the next hop in the path;

if any received reply message indicates that the destination router was reached, terminating the transmitting of path verification messages and the receiving of reply messages;

for any received reply message that includes information describing a layer in the hierarchy that is different from the current layer, modifying the label stack of the next transmitted path verification message and incrementing a time-to-live field of the plurality of time-to-live fields associated with the label in the label stack corresponding to the layer that is different from the current layer, wherein the values for any time-to-live fields associated with other labels in the label stack remain unchanged.

5. The computer system of claim 2, wherein the computer system further performs operations of:

repeating the steps of transmitting a path verification message and receiving a reply message, wherein:

for each successive path verification message transmitted in response to a received reply message, incrementing a time-to-live field of the plurality of time-to-live fields that is associated with a label corresponding to the current layer in the hierarchy, so that the path verification message travels to the next hop in the path;

if any received reply message indicates that the destination router was reached, terminating the transmitting of path verification messages and the receiving of reply messages;

for any received reply message that includes information describing a layer in the hierarchy that is different from the current layer, modifying the label stack of the next transmitted path verification message and incrementing a time-to-live field of the plurality of time-to-live fields associated with the label in the label stack corresponding to the layer that is different from the current layer, wherein the values for any time-to-live fields associated with other labels in the label stack remain unchanged.

6. The computer-readable non-transitory medium of claim 3, further comprising:

computer program code for repeating the steps of transmitting a path verification message and receiving a reply message, wherein:

for each successive path verification message transmitted in response to a received reply message, incrementing a time-to-live field of the plurality of time-to-live fields that is associated with a label corresponding to the current layer in the hierarchy, so that the path verification message travels to the next hop in the path;

if any received reply message indicates that the destination router was reached, terminating the transmitting of path verification messages and the receiving of reply messages;

for any received reply message that includes information describing a layer in the hierarchy that is different from the current layer, modifying the label stack of the next transmitted path verification message and incrementing a time-to-live field of the plurality of time-to-live fields associated with the label in the label stack corresponding to the layer that is different from the current layer, wherein the values for any time-to-live fields associated with other labels in the label stack remain unchanged.

7. The method of claim 4 wherein repeating further comprises:

if any received reply message is a failure reply message, wherein a failure reply message indicates that a transmitted path verification message did not reach its destination, terminating the transmitting of path verification messages and the receiving of reply messages; and wherein the method further comprises:

tracking any transmitted path verification message that results in a failure reply message; and processing the information contained within any tracked transmitted message and any received failure reply message to determine the location of an error in the hierarchy.

8. The method of claim 7 comprising:

determining if any tracked transmitted message includes a load balancing prevention identifier.

9. The method of claim 4 wherein repeating further comprises:

for any sequence of transmitted path verification messages and received reply messages, gathering at least one path quality statistic of interest concerning the path.

10. The method of claim 9 wherein the label switched path is a contiguous label switched path and the hierarchy includes a child layer and a parent layer, wherein transmitting the path verification message comprises:

transmitting a path verification message from an initial router of the child layer along a path, wherein a label stack of the path verification message from the initial router of the child layer includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router of the child layer;

and wherein the method comprises:

after gathering at least one path quality statistic of interest for the parent layer, choosing, at the initial router of the child layer, to transmit messages on a path different from the parent layer.

11. The method of claim 9 wherein the label switched path is a contiguous label switched path and the hierarchy includes a child layer and a parent layer, wherein transmitting the path verification message comprises:

transmitting a path verification message from an initial router of the child layer along a path, wherein a label stack of the path verification message from the initial router of the child layer includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router of the child layer;

and wherein the method comprises:

after gathering at least one path quality statistic of interest for the parent path, sending instructions from the initial router of the child layer to an initial router of the parent layer, wherein the instructions cause the initial router of the parent layer to route all messages received from the child layer to a path different from the parent path.

12. The method of claim 9 wherein a plurality of label switched paths are combined to form a stitched label switched path, wherein each label switched path in the plurality has a hierarchy, the method comprising:
- repeating the steps of transmitting, receiving, repeating, and gathering for each label switched path in the plurality of label switched paths.

13. The computer system of claim 5 wherein repeating further comprises:
- if any received reply message is a failure reply message, wherein a failure reply message indicates that a transmitted path verification message did not reach its destination, terminating the transmitting of path verification messages and the receiving of reply messages;
- and wherein the method further comprises:
- tracking any transmitted path verification message that results in a failure reply message; and
- processing the information contained within any tracked transmitted message and any received failure reply message to determine the location of an error in the hierarchy.

14. The computer system of claim 5 wherein repeating further comprises:
- for any sequence of transmitted path verification messages and received reply messages, gathering at least one path quality statistic of interest concerning the path.

15. The computer system of claim 14 wherein the label switched path is a contiguous label switched path and the hierarchy includes a child layer and a parent layer, wherein transmitting the path verification message comprises:
- transmitting a path verification message from an initial router of the child layer along a path, wherein a label stack of the path verification message from the initial router of the child includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; and
- wherein the computer system performs operations of:
- after gathering at least one path quality statistic of interest for the parent layer, choosing, at the initial router of the child layer, to transmit messages on a path different from the parent layer.

16. The computer system of claim 14 wherein the label switched path is a contiguous label switched path and the hierarchy includes a child layer and a parent layer, wherein transmitting the path verification message comprises:
- transmitting a path verification message from an initial router of the child layer along a path, wherein a label stack of the path verification message from the initial router of the child layer includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router; and
- wherein the computer system performs operations of:
- after gathering at least one path quality statistic of interest for the parent path, sending instructions from the initial router of the child layer to an initial router of the parent layer, wherein the instructions cause the initial router of the parent layer to route all messages received from the child layer to a path different from the parent path.

17. The computer system of claim 14 wherein a plurality of label switched paths are combined to form a stitched label switched path, wherein each label switched path in the plurality has a hierarchy, the computer system performing operations of:
- repeating the steps of transmitting, receiving, repeating, and gathering for each label switched path in the plurality of label switched paths.

18. The computer-readable non-transitory medium of claim 6 wherein the computer program code for repeating comprises:
- if any received reply message is a failure reply message, wherein a failure reply message indicates that a transmitted path verification message did not reach its destination, computer program code for terminating the transmitting of path verification messages and the receiving of reply messages;
- and wherein the computer program product further comprises:
- computer program code for tracking any transmitted path verification message that results in a failure reply message; and
- computer program code for processing the information contained within any tracked transmitted message and any received failure reply message to determine the location of an error in the hierarchy.

19. The computer-readable non-transitory medium of claim 18 comprising:
- computer program code for determining if any tracked transmitted message includes a load balancing prevention identifier.

20. The computer-readable non-transitory medium of claim 18 wherein the computer program code for repeating further comprises:
- for any sequence of transmitted path verification messages and received reply messages, computer program code for gathering at least one path quality statistic of interest concerning the path.

21. The computer-readable non-transitory medium of claim 20 wherein the label switched path is a contiguous label switched path and the hierarchy includes a child layer and a parent layer, wherein the computer program code for transmitting the path verification message comprises:
- computer program code for transmitting a path verification message from an initial router of the child layer along a path, wherein a label stack of the path verification message from the initial router of the child layer includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router;
- and wherein the computer program product comprises:
- after gathering at least one path quality statistic of interest for the parent layer, computer program code for choosing, at the initial router of the child layer, to transmit messages on a path different from the parent layer.

22. The computer-readable non-transitory medium of claim 20 wherein the label switched path is a contiguous label switched path and the hierarchy includes a child layer and a parent layer, wherein the computer program code for transmitting the path verification message comprises:
- computer program code for transmitting a path verification message from an initial router of the child layer along a path, wherein a label stack of the path verification message from the initial router of the child layer includes one or more labels, wherein each label in the label stack corresponds to a layer in the hierarchy of the path, wherein a time-to-live field is associated with each label, and wherein an initial value of the time-to-live field for the label corresponding to a current layer allows the path verification message to travel one hop along the path from the initial router;

and wherein the computer program product comprises:

after gathering at least one path quality statistic of interest for the parent path, computer program code for sending instructions from the initial router of the child layer to an initial router of the parent layer, wherein the instructions cause the initial router of the parent layer to route all messages received from the child layer to a path different from the parent path.

23. The computer-readable non-transitory medium of claim 20 wherein a plurality of label switched paths are combined to form a stitched label switched path, wherein each label switched path in the plurality has a hierarchy, and wherein the computer program code comprises: computer program code for repeating the computer program code for transmitting, the computer program code for receiving, the computer program code for repeating, and the computer program code for gathering for each label switched path in the plurality of label switched paths.

* * * * *